(12) United States Patent
Ellett

(10) Patent No.: US 8,770,524 B1
(45) Date of Patent: Jul. 8, 2014

(54) PIPE SUPPORT APPARATUS FOR PADDING AND CHOCKING

(71) Applicant: William A. Ellett, Houston, TX (US)

(72) Inventor: William A. Ellett, Houston, TX (US)

( * ) Notice: Subject to any disclaimer, the term of this patent is extended or adjusted under 35 U.S.C. 154(b) by 0 days.

(21) Appl. No.: 13/784,162

(22) Filed: Mar. 4, 2013

(51) Int. Cl.
*F16L 3/00* (2006.01)
*F16L 3/16* (2006.01)
*E21B 19/14* (2006.01)

(52) U.S. Cl.
USPC .............................. 248/49; 248/55; 211/70.4

(58) Field of Classification Search
USPC ............. 248/49, 55, 346.01, 345.1; 211/59.4, 211/60.1, 70.4, 85, 18, 85.22
See application file for complete search history.

(56) References Cited

U.S. PATENT DOCUMENTS

| 3,668,740 | A | * | 6/1972 | Pearson | 24/16 PB |
|---|---|---|---|---|---|
| 4,175,666 | A | * | 11/1979 | Smith | 211/85.18 |
| 4,735,320 | A | * | 4/1988 | Hoss | 206/583 |
| 5,335,887 | A | * | 8/1994 | Torrens et al. | 248/49 |
| 5,556,062 | A | | 9/1996 | Ellett | |
| 5,879,102 | A | * | 3/1999 | Koliopoulos | 403/374.1 |
| 5,971,346 | A | * | 10/1999 | Monneau et al. | 248/610 |
| 6,170,789 | B1 | * | 1/2001 | Hayakawa | 248/346.01 |
| 6,224,024 | B1 | | 5/2001 | Fritz | |
| 6,863,248 | B2 | | 3/2005 | Calais et al. | |
| 7,131,620 | B2 | | 11/2006 | Murphy | |
| 7,331,553 | B2 | * | 2/2008 | Kling et al. | 248/313 |
| 7,694,917 | B2 | * | 4/2010 | Gabriel | 248/49 |
| 8,387,805 | B2 | * | 3/2013 | Olivier | 211/70.4 |
| 2010/0183372 | A1 | * | 7/2010 | Coleman | 405/184 |
| 2010/0294389 | A1 | * | 11/2010 | Souza et al. | 138/110 |

OTHER PUBLICATIONS

"Technical Notes: PipePillo (TM)" by Pipesak, published in Dec. 2011, brochure for products.

* cited by examiner

*Primary Examiner* — Anita M King
*Assistant Examiner* — Daniel Johnson
(74) *Attorney, Agent, or Firm* — Andrew W. Chu; Craft Chu PLLC

(57) ABSTRACT

The pipe support apparatus of the present invention includes a length of flexible webbing having a first receptacle formed at one end of the length and a second receptacle formed at an opposite end of the webbing. A first rigid member has a locking bracket received within the first receptacle, and a second rigid member has another locking bracket received within the second receptacle. A landing pad is transversely extended from the length of flexible webbing and is positioned on the length of flexible webbing between the first and second rigid members. The length of webbing and landing pad form a pipe receiving surface between the first and second rigid members, the pipe receiving surface being a top surface of the webbing and a top surface of the landing pad.

18 Claims, 2 Drawing Sheets

PIPE SUPPORT APPARATUS FOR PADDING AND CHOCKING

RELATED U.S. APPLICATIONS

Not applicable

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to an apparatus for padding and chocking pipes. More particularly, the present invention relates to an apparatus for maintaining stability of cylindrical pipe members on a flat surface with improved stability and pad orientation.

2. Description of Related Art Including Information Disclosed Under 37 CFR 1.97 and 37 CFR 1.98.

The transport and storage of cylindrical objects rely upon chocks to prevent lateral movement and to avoid damage to the objects. With regard to pipeline construction, protection during transport is a major concern because there are additional concerns for preventing damage to the pipe coating on the cylindrical pipes as well. Prior art chocks are typically wedges of materials placed against the pipe or other cylindrical object. As the pipe rolls back and forth, the chock impedes this rolling action of the pipe from side to side. However, these chocks can move and slide around and along the pipe such that the chock is no longer effectively placed against the pipe to prevent movement. Pipeline applications further require padding to prevent scratching and other surface damage, such as dents. The combination of padding and chocking has led to the development of pipe support technology.

Development of pipe supports for pipeline and other cylindrical objects has addressed the need for light-weight, easily handled, and sturdy devices to withstand repetitive and frequent use. In the past, various patents have issued which relate to the present invention.

U.S. Pat. No. 5,556,062, issued on Sep. 17, 1996 to the present inventor, teaches a padding and chocking apparatus for pipe sections. The chocks are formed by cylindrical rigid members connected by a strap of webbing. The chocks prevent the rotation, and the webbing prevents surface damage. The rigid members are cylindrical blocks that slide into receptacles form at the ends of the strap, such that the pipe is positioned on the strap and between the rigid members. The device integrates the padding and chocking in a single unit.

U.S. Pat. No. 6,224,024, issued on May 1, 2001 to Fritz discloses a portable retention and transport apparatus comprised of a series of tubes connected at their first and second ends via two flexible cables. The connecting cables are sufficiently short to create a span between the tubes whose length is less than the outer diameter of the cylindrical object, such that the cylindrical object is cradled between adjacent tubes. The tubes also include additional padding to increase frictional engagement of the tubes with both the cylindrical object.

U.S. Pat. No. 6,863,248, issued on Mar. 8, 2005 to Calais et al. describes a pipeline support for a pipeline along a longitudinal axis. First and second longitudinally extending cylindrical supports are connected by transversely extending threaded rigid rods. The first support is locked at one end of the rods, and the second support is movable along the rods, toward and away from the first support, so that any diameter pipeline can rest between the first and second supports as chocks. The pipeline support is only adjustable from one side of the pipeline.

U.S. Pat. No. 7,131,620, issued on Nov. 7, 2006 to Murphy, teaches a related structure for a portable travel grip. Although unrelated to pipe transport, this invention shows a strap with two receptacles for holding cylindrical objects at ends of the strap. The hanging cylindrical object acts as a handle or grip, while the other cylindrical object is an anchor wedged into a vehicle window. The concept of the strap with receptacles for cylindrical objects is taught generally by the present invention.

The publication by PipeSak™ under "Technical Notes: PipePillo™" in December 2011 also discloses a pipe stabilizing device. A polypropylene tray is formed in a generally frustoconical shape. The concavity of the tray prevents the pipe from lateral movement, while the tray itself supports the weight of the pipe. The trays are stackable to adjust height for a pipe. A center hole allows for alignment of the stacked trays. There is no need for a skid, since the trays can be stacked. Although patents are mentioned in the disclosure, there was no apparent marking or disclosure of the actual patent information.

It is an object of the present invention to provide a pipe support apparatus for padding and chocking.

It is another object of the present invention to provide an improved padding surface of the pipe support apparatus.

It is another object of the present invention to reduce the risk of slippage of the prior art devices.

It is still another object of the present invention to provide a portable, easily to install, and durable apparatus for transporting pipes in a pipeline application.

These and other objects and advantages of the present invention will become apparent from a reading of the attached specification and appended claims.

SUMMARY OF THE INVENTION

The present invention is a pipe support apparatus including a length of flexible webbing, a first rigid member, a second rigid member, and a landing pad. The length of flexible webbing has a first receptacle formed at one end of the length and a second receptacle formed adjacent an opposite end of the webbing. The first and second rigid members each have a locking bracket, the locking bracket of the first rigid member received within the first receptacle and the locking bracket of the second rigid member received within the second receptacle. A landing pad is transversely extended from the length of flexible webbing and being centered on the length of flexible webbing between the first and second rigid members. The length of webbing and the landing pad forms a pipe receiving surface between the first and second rigid members, the pipe receiving surface being a top surface of the webbing and a top surface of the landing pad.

DETAILED DESCRIPTION OF THE DRAWINGS

Referring to FIGS. 1-4, there is shown a perspective view of the pipe support apparatus 10 of the present invention. The apparatus 10 includes a length 12 of flexible webbing having a first receptacle 14 formed at one end of the length 12 and a second receptacle 16 formed at an opposite end of the webbing. The flexible webbing is durable and compressible. The preferred embodiment, as shown, has layers of the material to form the length 12. Each of the first and second receptacles can be a loop of flexible material continuous with the top surface of the length 12.

Figure 1:
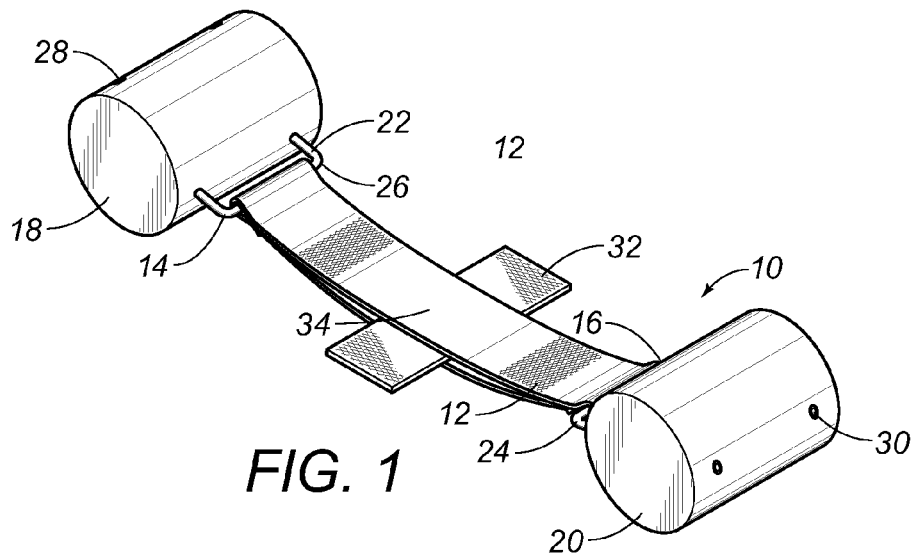
FIG. 1 shows a perspective view of the pipe support apparatus of the present invention.

FIG. 1 further shows a view of the first rigid member 18 and second rigid member 20. As presented, the rigid members 18 and 20 are typically cylindrical. The first rigid member 18 has a locking bracket 22, and the locking bracket 22 of the first rigid member 18 is received within the first receptacle 14. Similarly, the second rigid member 20 has a locking bracket 24, and the locking bracket 24 of the second rigid member 20 is received within the second receptacle 16. When the receptacles 14 and 16 are loops, they form openings suitable for slidable receipt of respective locking brackets 22, 24 of the first and second rigid members 18, 20. In this manner, there is no possible slippage of the first rigid member 18 from a loop of the length 12 because a closed locking bracket 22 securely links the solid body of the first rigid member 18.

Figure 2:
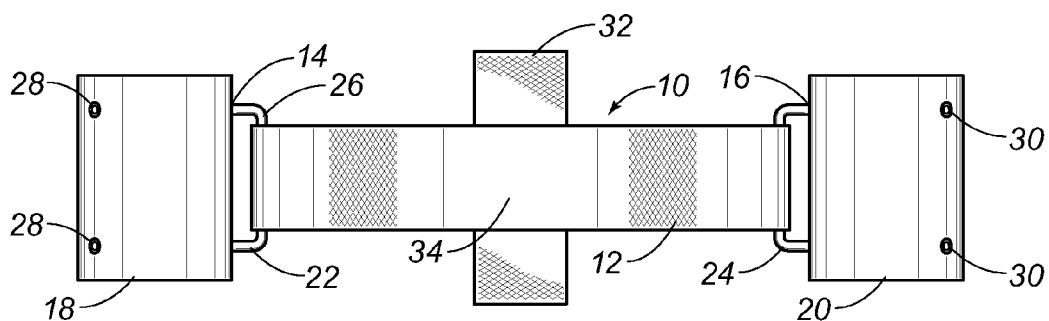
FIG. 2 shows a top plan view of the pipe support apparatus of the present invention.

The embodiments of the locking brackets 22 and 24 have inventive features. Each bracket 22 and 24 has a width greater than width of the length 12 of flexible webbing. Consequently, the height of the first rigid member 18 and second rigid member 20 is greater than the width of the locking brackets. Additionally, the locking brackets 22 and 24 are fixedly engaged to the respective rigid members 18 and 20 by a two-prong bracket element 26 with a nut and bolt assembly 28 threaded onto ends of the two-prong bracket element 26. As seen in FIGS. 1 and 2, there are two holes 30 on a side of the respective rigid member 18 and 20, which contain the nut and bolt assembly 28. The assembly 28 securely locks the brackets 22 and 24 in place within the rigid members 18 and 20. This assembly 28 can be disengaged for switching the length 12 from a particular bracket 22 and 24. In this manner a new length can be substituted to adjust the application and functionality of the transport assistance for any diameter pipe. Besides releasing the brackets 22 and 24 to substitute a length 12 of a different length dimension, the apparatus 10 can also be extended by reversing the attachment of the rigid members 18 and 20. The holes 30 with the nut and bolt assembly 28 can be reversed with the entry holes of the brackets 22 and 24, such that the entry of the brackets 22 and 24 are switched to the opposite sides of the rigid members 18 and 20. The brackets 22 and 24 are locked in a different position spaced further apart from each other. As such, the length of the apparatus 10 is extendable by different mounting of the rigid members 18 and 20, in addition to switching out the length 12 of different dimensions.

FIGS. 1-4 also show the apparatus 10 of the present invention with a landing pad 32 being transversely extended from the length 12 of flexible webbing. This pad 32 is centered on the length 12 of flexible webbing between the first and second rigid members 18 and 20. The landing pad 32 is comprised of flexible material and has a width greater than a width of the length 12 of flexible webbing. Also, the landing pad 32 has a thickness less than a thickness of the length 12 of flexible webbing. As in FIGS. 1 and 2, the length 12 of webbing and the landing pad 32 form a pipe receiving surface 34 between the first and second rigid members 18 and 20. The pipe receiving surface 34 is a top surface of the webbing and a top surface of the landing pad 32.

Figure 3:
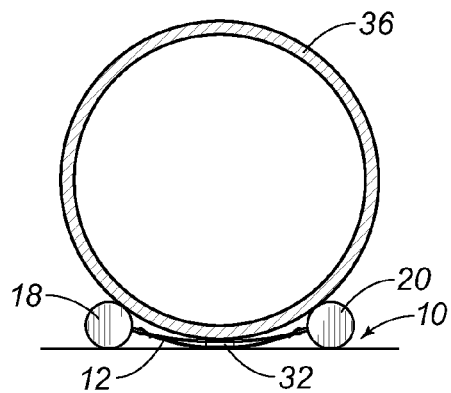
FIG. 3 shows a side elevational view of the pipe support apparatus of the present invention in relation to a pipe for transport.
Figure 4:
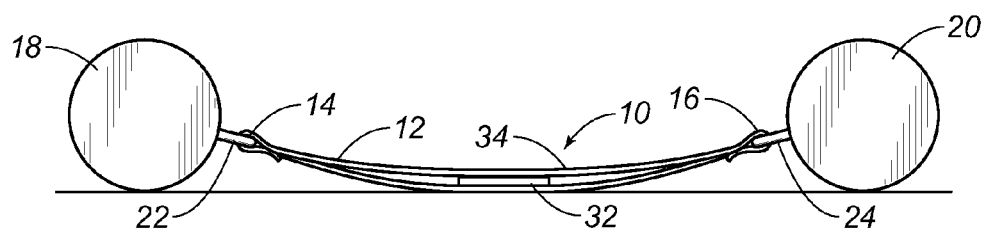
FIG. 4 shows another side elevational view, according to FIG. 3, without the pipe for transport.

As shown in FIG. 3, the pipe 36 is positioned between the rigid members 18 and 20, wherein the rigid members 18 and 20 function as chocks against rotation of the pipe 36. The length 12 and pad 32 provide further protection from scratches and sliding as padding. Importantly, the pad 32 is transverse to the length 12, such that the pipe 36 stabilizes the length 12 and avoids deformation or twisting of the length 12. The weight of the pipe 36 maintains the pad 32 in a flat position so that the length 12 cannot twist and deform in any direction. This improvement ensures safer conditions and easy verification of correct installation. Similarly, FIG. 4 includes a close-up view of the length 12, showing the multi-layer embodiment and the shared top surface with the landing pad 32.

Figure 5:
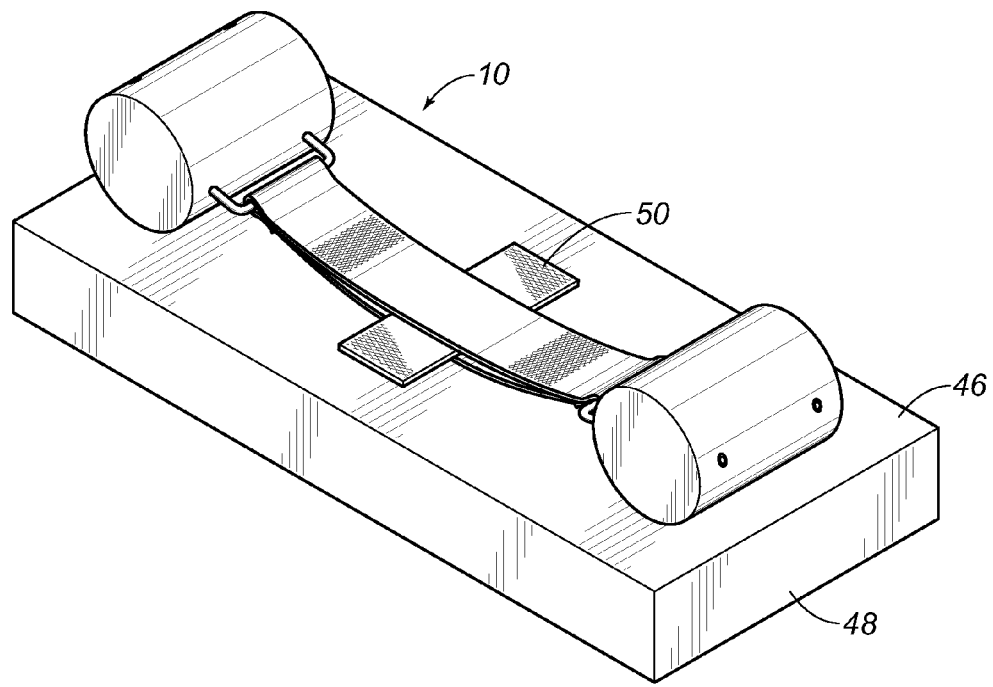
FIG. 5 is another perspective view of the pipe support apparatus of the present invention as supported by a pipe support skid.

In FIG. 5, the pipe support apparatus 10 rests upon the top surface 46 of a pipe support skid 48. The pipe support skid 48 has a length greater than the length of the pipe support apparatus 10 and a width that is generally greater than a width of the webbing 50. At least one portion of the pipe support apparatus 10 will rest in contact with the top surface 46 of the pipe support skid 48. The pipe support skid 48 adjusts the height of the apparatus 10 to account for different positions of the pipe to be transported.

The pipe support apparatus 10 for padding and chocking of the present invention is an improvement over the known prior art. The padding surface includes a landing pad portion, which stabilizes the length without risking further damage to the surface of the pipe. The prior art cables and straps do not have this stabilization means and fail to protect the pipe surface from twisted wires and cables in the event of displacement either end of the prior art pipe support. The flexible material can be applied to the landing pad, so as to allow for continuity of the surface to surface contact with the pipe and ease of manufacturing. Furthermore, the locking brackets of the present invention present an innovation to reduce the risk of slippage of the prior art devices. Cylindrical elements are simply inserted in sleeves and receptacles, without regard to maintaining the position of these blocks in relation to the strap. The tentative connection of the rigid member and large loops create great risks for inaccurate installation and unstable chocking. The locking brackets of the present invention as anchored to the length are a clear improvement of the prior art. Furthermore, the locking brackets are covered by the length of webbing material which prevents potential damaging contact between the pipe and the locking bracket.

The pipe support apparatus of the present invention is portable, easily to install, and durable for transporting pipes in a pipeline application. The padding and chocking of the present invention represent improvements over the prior art devices in terms of a padding pattern to prevent damage and stabilizing the chocking effect. The present invention balances the protection and installation concerns into an innovative solution that has not been disclosed by the prior art.

The foregoing disclosure and description of the invention is illustrative and explanatory thereof. Various changes in the details of the described system, along with the steps of the described method, can be made within the scope of the appended claims without departing from the true spirit of the invention. The present invention should only be limited by the following claims and their legal equivalents.

I claim:

1. A pipe support apparatus comprising:
   a length of flexible webbing having a first receptacle formed at one end of said length of flexible webbing and a second receptacle formed at an opposite end of said length of said flexible webbing;
   a first rigid member with a locking bracket, said locking bracket of said first rigid member received within said first receptacle;
   a second rigid member with a locking bracket, said locking bracket of said second rigid member being received within said second receptacle; and
   a landing pad being transversely extended from said length of flexible webbing and being positioned on said length of flexible webbing between the first and second rigid members,
   wherein said length of flexible webbing and said landing pad forms a pipe receiving surface between said first and second rigid members, said pipe receiving surface being a top surface of said length of flexible webbing and a top surface of said landing pad.

2. The pipe support apparatus of claim 1, each of said first and second receptacles being comprised of a loop having an opening suitable for slidable receipt of respective locking brackets of said first and second rigid members.

3. The pipe support apparatus of claim 1, each of said first rigid member and said second rigid member having a cylindrical shape.

4. The pipe support apparatus of claim 1, wherein the locking brackets are fixedly engaged to the respective rigid members on a first side by a two-prong bracket element with a nut and bolt assembly threaded onto ends of said two-prong bracket element.

5. The pipe support apparatus of claim 4, wherein the locking brackets are fixedly engaged to the respective rigid members on a second side by a two-prong bracket element with a nut and bolt assembly threaded onto ends of said two-prong bracket element, said second side being opposite said first side.

6. The pipe support apparatus of claim 1, wherein the locking brackets have a width greater than a width of said length of flexible webbing.

7. The pipe support apparatus of claim 1, wherein said landing pad is comprised of flexible material.

8. The pipe support apparatus of claim 1, wherein said landing pad has a width greater than a width of said length of flexible webbing.

9. The pipe support apparatus of claim 1, wherein said landing pad has a thickness less than a thickness of said length of flexible webbing.

10. The pipe support apparatus of claim 1, further comprising:
    a pipe support skid positioned under said length of flexible webbing and first and second rigid members.

11. The pipe support apparatus of claim 10, said pipe support skid having a top surface, and said length of flexible webbing having a portion contacting said top surface.

12. A pipe support apparatus comprising:
    a length of flexible webbing having a first receptacle formed at one end of said length of flexible webbing and a second receptacle formed at an opposite end of said length of said flexible webbing;
    a first rigid member with a locking bracket, said locking bracket of said first rigid member being affixed to said first receptacle;
    a second rigid member with a locking bracket, said locking bracket of said second rigid member being affixed to said second receptacle;
    a pipe positioned on a top surface of said length of flexible webbing between first and second rigid members; and
    a landing pad being transversely extended from said length of flexible webbing.

13. The pipe support apparatus of claim 12, further comprising:
    a pipe support skid positioned on an opposite side of said length of flexible webbing from said pipe.

14. The pipe support apparatus of claim 12, wherein said landing pad has a first portion extending transversely outward from one edge of said length of flexible webbing, and wherein said landing pad has a second portion extending transversely outward from an opposite edge of said length of flexible webbing.

15. The pipe support apparatus of claim 14, said landing pad being centered between said first and second rigid members.

16. The pipe support apparatus of claim 12, each of said first rigid member and said second rigid member having a cylindrical shape.

17. The pipe support apparatus of claim 16, each of said locking bracket of said first rigid member and said locking bracket of said second rigid member having a generally U-shaped configuration.

18. A pipe support apparatus comprising:
    a length of flexible webbing having a first receptacle formed at one end of said length of flexible webbing and a second receptacle formed at an opposite end of said length of flexible webbing;
    a first rigid member with a locking bracket, said locking bracket of said first rigid member being affixed to said first receptacle;
    a second rigid member with a locking bracket, said locking bracket of said second rigid member being affixed to said second receptacle; and
    a pipe support skid positioned under said length of flexible webbing and first and second rigid members,
    wherein said length of flexible webbing and said landing pad forms a pipe receiving surface between said first and second rigid members, said pipe receiving surface being a top surface of said length of flexible webbing and a top surface of said landing pad.

\* \* \* \* \*